United States Patent
Zhang et al.

(10) Patent No.: US 11,003,597 B2
(45) Date of Patent: May 11, 2021

(54) MEMORY DOMAINS PROTECTION METHOD AND APPARATUS WITH COMPOSITE PROTECTION KEY NUMBERS

(71) Applicant: Intel Corporation, Santa Clara, CA (US)

(72) Inventors: Mingwei Zhang, Hillsboro, OR (US); Ravi Sahita, Portland, OR (US); David A. Koufaty, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/229,857

(22) Filed: Dec. 21, 2018

(65) Prior Publication Data
US 2019/0129867 A1 May 2, 2019

(51) Int. Cl.
| | | |
|---|---|---|
| *G06F 12/14* | (2006.01) | |
| *G06F 12/1009* | (2016.01) | |
| *H04L 9/08* | (2006.01) | |
| *G06F 21/78* | (2013.01) | |
| *G06F 12/1027* | (2016.01) | |
| *G06F 21/55* | (2013.01) | |
| *G06F 21/79* | (2013.01) | |
| *H04L 9/00* | (2006.01) | |

(52) U.S. Cl.
CPC ...... *G06F 12/1483* (2013.01); *G06F 12/1009* (2013.01); *G06F 12/1027* (2013.01); *G06F 12/1441* (2013.01); *G06F 12/1475* (2013.01); *G06F 21/556* (2013.01); *G06F 21/78* (2013.01); *G06F 21/79* (2013.01); *H04L 9/002* (2013.01); *H04L 9/0894* (2013.01); *G06F 2212/1052* (2013.01); *H04L 2209/12* (2013.01)

(58) Field of Classification Search
None
See application file for complete search history.

(56) References Cited

U.S. PATENT DOCUMENTS

2016/0350019 A1\* 12/2016 Koufaty ............... G06F 3/0622
2017/0286326 A1\* 10/2017 Guim .................. G06F 12/1009
2019/0042733 A1    2/2019 Zhang et al.

OTHER PUBLICATIONS

"Google Native Client", retrieved on Apr. 16, 2019. 3 pages, www.developer.chrome.com/native-client.
Intel, "Speculative Execution Side Channel Mitigations", May 2018, 23 pages.
Intel, "Control-flow Enforcement Technology Preview", Jun. 2017, 145 pages.

\* cited by examiner

*Primary Examiner* — Charles J Choi
(74) *Attorney, Agent, or Firm* — Schwabe, Williamson & Wyatt, P.C.

(57) ABSTRACT

In embodiments, an apparatus for computing includes a protection key register (PKR) having $2^N$ bits, where N is an integer, to store a plurality of permission entries corresponding to protected memory domains, and a protected memory domain controller, coupled to the PKR. In embodiments, the memory domain controller is to: obtain protection key (PK) bits from a page table entry for a target page address; obtain one or more additional PK bits from a target linear memory address; and combine the PK bits and the additional PK bits to form a PK domain number to index into the plurality of permission entries in the PKR to obtain a permission entry for a protected memory domain.

25 Claims, 7 Drawing Sheets

MEMORY DOMAINS PROTECTION METHOD AND APPARATUS WITH COMPOSITE PROTECTION KEY NUMBERS

FIELD

The present invention relates to the technical field of computing, and, in particular, to apparatus, computer readable media and methods related to memory domains with composite protection key (PK) numbers, providing extended number of protected memory domains.

BACKGROUND

Speculative execution is one of the main techniques used by modern high end processors to improve performance. The concept behind speculative execution is that instructions are executed ahead of knowing that they are required. Without speculative execution, the processor might need to wait for prior instructions to be resolved before executing subsequent ones. By executing instructions speculatively, performance can be increased by minimizing latency and extracting greater parallelism. However, speculative execution is vulnerable to a relatively new form of attack, known as "speculative execution side-channel (SESC) attacks."

For example, "Spectre" is a vulnerability that affects processors that perform speculative execution based on branch prediction. On many processors, speculative execution resulting from a branch "mis-prediction" may leave observable side effects which reveal private data to attackers. For example, if the pattern of memory accesses performed by the speculative execution depends on private data, the resulting state of the data cache might be accessible via a side channel, through which an attacker may be able to extract information about the private data. While some mechanisms for SESC mitigation have been proposed, the performance overhead is often costly, especially as regards Spectre v1. For example, full prevention of a Spectre v1 attack requires adding memory fences (lfence/mfence) after every branch instruction, which is a major cause of performance slow down.

DETAILED DESCRIPTION

To address the challenges described in the background section, an extended PK based protected memory domains technology is disclosed herein. In embodiments, an apparatus for computing includes a protection key register (PKR) having $2^N$ bits, where N is an integer, to store a plurality of permission entries corresponding to protected memory domains, and a protected memory domain controller, coupled to the PKR. In embodiments, the protected memory domain controller is arranged to: obtain protection key (PK) bits from a page table entry for a target page address; obtain one or more additional PK bits from a target linear memory address; and combine the PK bits and the additional PK bits to form a PK domain number to index into the plurality of permission entries in the PKR to obtain a permission entry for a protected memory domain.

In embodiments, one or more non-transitory computer-readable storage media includes a set of instructions, which, when executed on memory control logic (MCL) coupled to a protection domain permission register (PDPR) that stores a plurality of permission entries corresponding to protected memory domains, causes the MCL to read PK bits from a page table entry for a target page address, and read one or more additional PK bits from a target linear memory address. In embodiments, when executed, the instructions further cause the MCL to combine the PK bits and the additional PK bits to form a protected memory domain number (PMDN) to index into the plurality of entries in the PDPR, to obtain a permission entry relating to a protected memory domain (PMD).

In embodiments, a method of obtaining memory domain permissions by a memory controller (MC) of a CPU, the MC coupled to a protection key register (PKR) that stores a plurality of permission entries corresponding to protected memory domains, includes obtaining first protection key (PK) bits from a page table entry for a target page address, and second PK bits from a target linear memory address. The method further includes combining the first PK bits and the second PK bits to form a PK domain number, the PK domain number an index into the plurality of permission entries in the PKR, and, using the PK domain number, obtaining a permission entry of the PKR for a protected memory domain (PMD).

In embodiments, a PKR (or PDPR) entry may have two bits, a first bit indicating whether the protected memory domain may be accessed at all, and a second bit indicating whether the protected memory domain may be written into. Protection keys (PK) are a hardware feature that is used to prevent accidental memory accesses to, for example, databases. However, as currently implemented, PKs allow a user program to separate their virtual memory into only 16 domains in page granularity. This limitation is the effect of only four bits allocated to a PK in a page table entry (PTE), for example, 62:59 in the PTE of some systems. To change that allocation is difficult, as such a change would likely conflict with other CPU features. Additionally, Microsoft uses all of the unused PTE bits currently available for their own software memory management.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), (A) or (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

As used herein, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

As used herein, including in the claims, the term "chip" may refer to a physical integrated circuit (IC) on a computer. A chip in the context of this document may thus refer to an execution unit that can be single-core or multi-core technology.

As used herein, including in the claims, the term "processor" may refer to a logical execution unit on a physical chip. A multi-core chip may have several cores. As used herein the term "core" may refer to a logical execution unit containing an L1 (lowest level) cache and functional units. Cores are understood as being able to independently execute programs or threads.

A key advantage of PKs is to allow a user program to quickly switch memory permissions of the memory domains in one instruction, as opposed to requiring heavyweight operations to change page permissions, such as, for example, launching a system call to mprotect(2) or VirtualProtect that flushes a translation lookaside buffer (TLB). A PK is thus used to control data accesses to memory pages in each protected memory domain. In addition, recent experiments have demonstrated its capability to prevent speculative execution side channels, especially Spectre v1 attacks. In particular, a PK denies both direct and speculative memory accesses that cross different memory domains if a PK permission is violated.

As noted, PKs may be used to control access to memory on a per page basis. When PKs are enabled, four bits in each page-table entry may be used to assign one of sixteen "key" values to any given page. Similarly, there may be a separate register (different than the TLB in which the page table is stored) that stores two bits for each PK value, such as, for example, a "write disable" value and a "read disable" value. Setting a "write disable" bit for a given key may block all attempts to write a page with that key value, while setting the "access disable" bit may block all reads as well. Memory protection keys thus allow a process to partition its memory space into a maximum of sixteen regions and to selectively disable or enable access to any of those regions. As a control register (e.g., PKRU 250 in FIG. 2) may be local to each thread, different threads may enable or disable different regions independently. Moreover, applications may set the PKs using any of the system calls that set other page protections, such as mprotect( ), for example. As described below, the implementation of memory protection key technology along with control flow integrity technology allows for a level of protection for untrusted code.

However, the downside of current PK based approach is the limitation that PKs support only 16 domains. Extending the number of domains would require extra bits in a page table entry (PTE) being allocated to PK bits, and this would generate significant discord, as such a choice would likely go into contention with other CPU features that also use PTE bits. In addition, as the length of physical addresses is increased, it is also likely that extending PK bits in a PTE would conflict with physical address bits. Currently, for example, four PTE bits are standardized as being PK bits. In some systems, for example, these are bits 62:59. Thus, there are a very limited number of PTE bits currently available that could even be used, which would not solve the problem. Still worse, some operating systems (OS) have already used all unused PTE bits for their own memory management purposes.

Currently, in order to mitigate Spectre v1 attacks, the only effective solution known to the inventors is to add fences everywhere, especially following a branch instruction. In so doing, a speculative execution path cannot occur until all memory accesses (e.g., load or load/store) retire before the branch, and thus any Spectre attack is thus obviated. However, this approach may likely incur a huge overhead. In comparison, putting untrusted code into a speculative execution resilient sandbox enjoys much better performance, as any speculative execution happening inside the sandbox generates no harm. Following this approach, previous work has focused on the details of building a sandbox based on a combination of PKs and control flow technology, e.g., Intel's Memory Protection Key (MPK) technology and/or Control Flow Enforcement technology (CET). This approach utilizes the conventional 16 protected memory domains available, using the four PKEY bits in a conventional page table entry. However, in many scenarios such as JavaScript JITed (just-in-time generated) code, there might be situations where more than 16 domains are needed, and this approach is then incapable of being implemented.

Thus, according to various embodiments, an alternative method is used to extend the number of memory domains supported by PKs and thereby extend the same capability of side channel prevention to any sandbox built from CET and PK technologies. In embodiments, this may be accomplished without any change to existing PK interfaces, e.g., Industry Standard Architecture (ISA), but, instead, by modifying PK permission checking. For clarity, in what follows, the terms "protection domain", "protected domain" and "domain" are sometimes used interchangeably.

In embodiments, in building a CET/PK based sandbox, the code/data is first divided into trusted and untrusted parts for target user applications. Generally, this is easily accomplished, as the trusted parties are usually third-party code/plugins or generated code. Second, trusted code/data and untrusted code/data are respectively allocated into memory with a different PK. This may be accomplished, for example, using a standard system call interface. In so doing, when code is executing in a second protected domain, all of the code/data in a first protected domain cannot be executed.

Figure 1A:
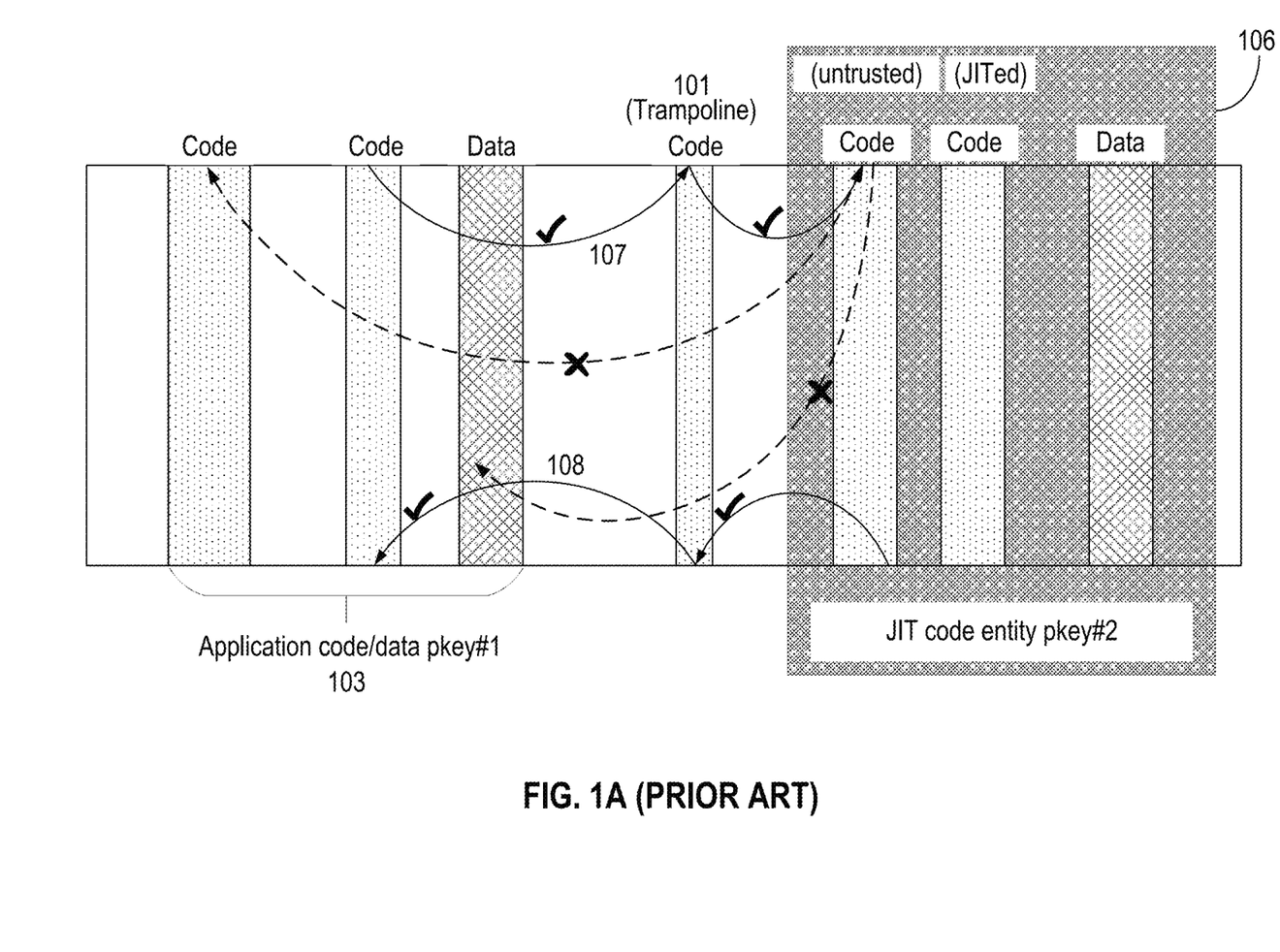
FIG. 1A illustrates an example of untrusted code separated from trusted code using two protection keys, in accordance with various embodiments.

Moreover, to prevent malicious control flows that attempt to cross protected memory domains, in embodiments, PKs may be implemented, and a "trampoline" used. A trampoline is code that provides a valid path between different domains. This is illustrated in FIG. 1A, which shows untrusted JITed code segregated in domain 2, (protected by pkey#2) separated from secure application code 103 in domain 1 (protected by pkey#1), in accordance with various embodiments. FIG. 1A thus illustrates a combination of protection key and control flow integrity technologies. In FIG. 1A, all code executing inside the untrusted code sandbox 106 may neither access outside memory nor execute code (e.g., application code) outside of sandbox 106, as shown by the dotted line pathways running out of sandbox 106 with an "X" on them. Also, trusted application code 103 that is executed outside of untrusted code sandbox 106 may neither directly access memory inside of untrusted code sandbox 106, nor be executed inside of the sandbox (not shown in FIG. 1A). In embodiments, trampoline code 101 serves as the connection between the untrusted and the trusted code. In embodiments, trampoline code 101 may provide instructions for communication or control transfer between untrusted code and trusted code, as shown by pathways 107 and 108, respectively marked with a check symbol. As shown, trampoline code may also protect application code 103.

In addition, due to the fact that PKs do not prevent code execution (they only prevent memory accesses), in embodiments both trusted code 103 in protected domain #1 and untrusted code in protected domain #2 may be secured using control flow integrity, e.g., Intel's CET. However CET is coarse-grained in that untrusted code could go to anywhere in trusted code as well as there is an endbranch instruction (the instruction that used in CET to constrain forward indirect branches). Therefore, in embodiments, immediately behind each endbranch there is placed a memory probe instruction that reads its own code location. By doing so, any malicious control flows that do not go through trampoline code will fault. In other words, trampoline code is the only valid path to go through different domains. In particular, trampoline code is the place to switch memory permissions using PKs. This is illustrated in FIG. 1B, next described.

Figure 1B:
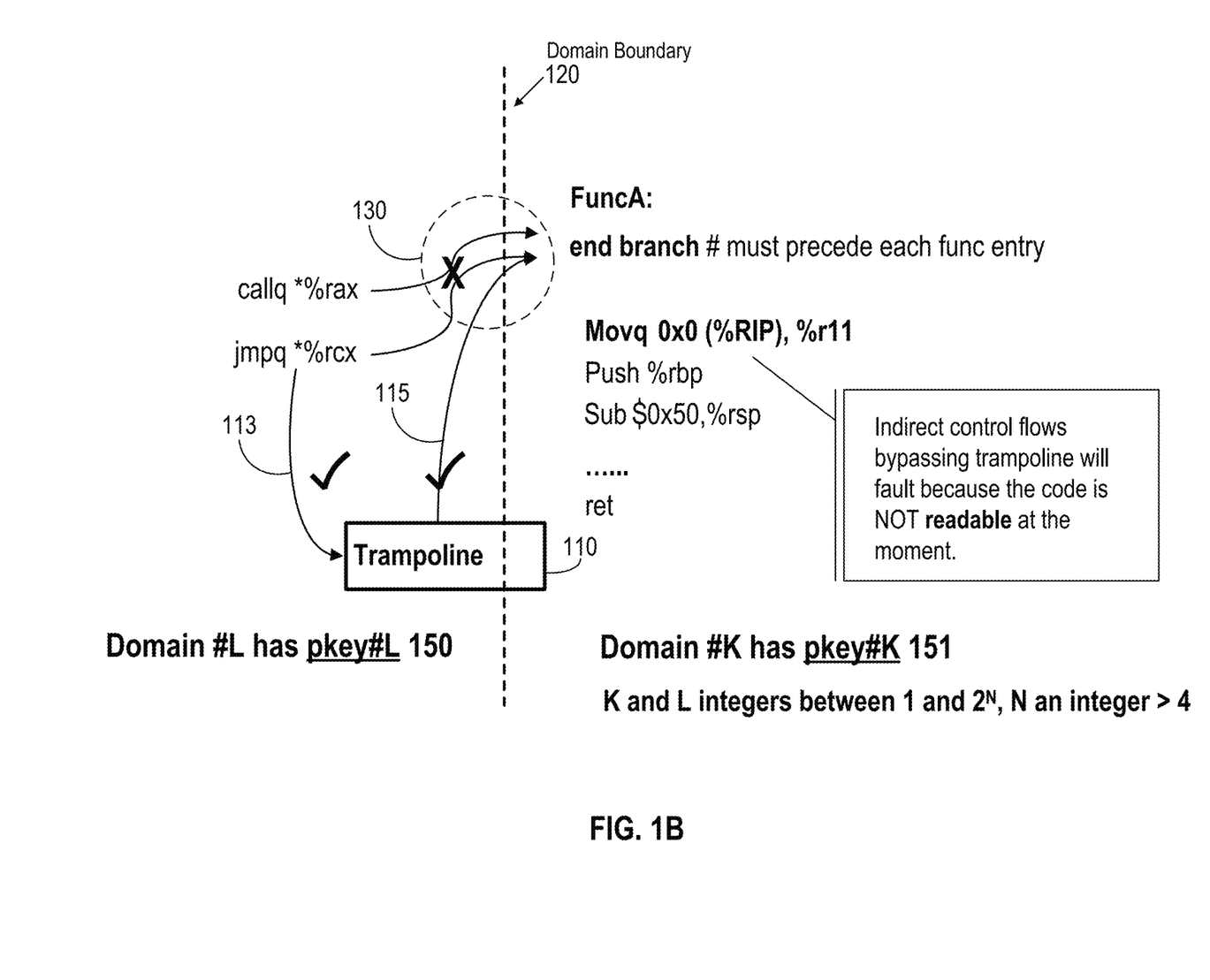
FIG. 1B illustrates prevention of malicious control flows using extended PK based protected memory domains, in accordance with various embodiments.

With reference to FIG. 1B, there are shown two example protection domains, L 150 and K 151, respectively protected by PKs pkey#L and pkey#K. L and K are integers in the range $1-2^N$, where N is an integer greater than 4, where $2^N$ is the total number of extended protected domains supported by the system, such as, for example, 64, 128 or 256. As described in detail below in connection with FIG. 2, in order to obtain PK permissions for these extended protected domains, a composite PK number must be formed. As shown in FIG. 1B, the instructions at the top left of FIG. 1B may not directly call or jump to FuncA, which is across domain boundary 120. If they so attempt, the instructions will fault, as shown at 130. In order to call FuncA, any code from domain L must go through trampoline 110, as shown by legitimate flow paths 113 and 115, from code in domain L into trampoline, and out of trampoline into domain K, respectively. Additionally, as shown at 135, indirect control flows bypassing trampoline 101 will fault because the code is not readable at the moment.

Figure 2:
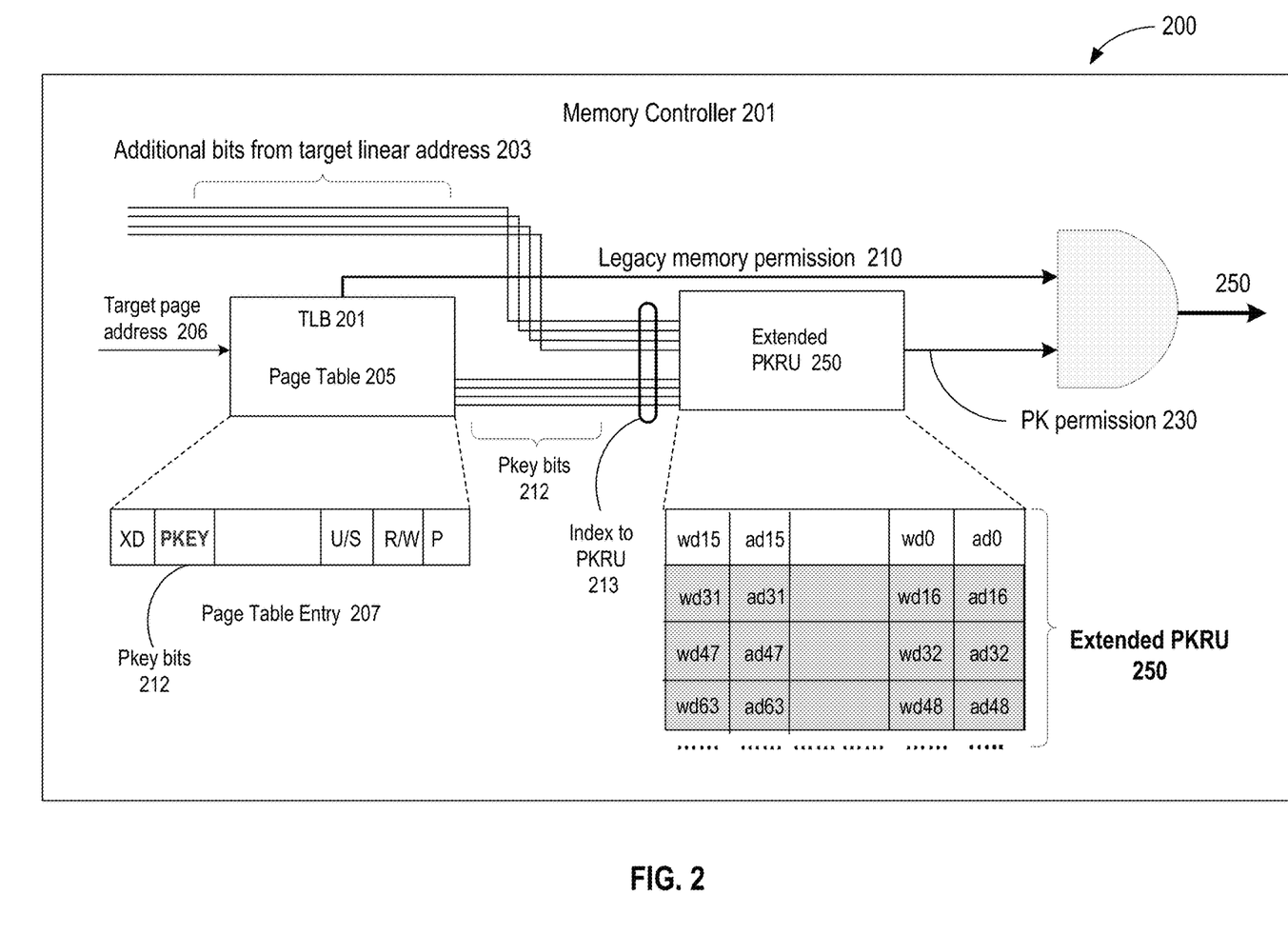
FIG. 2 illustrates an example computing apparatus incorporated with the extended memory domain technology of the present disclosure, in accordance with various embodiments.

FIG. 2 illustrates an example computing device 200 incorporated with the extended PK based memory protection technology of the present disclosure, according to various embodiments. For example, the device may be a memory controller, or for example, a memory execution unit, and the device may be provided in a processor or CPU. Computing device 200 includes TLB 201, which stores page table 205. In some embodiments, there may be layers of TLBs, in which case if there is no page table entry 207 in TLB 201, a secondary TLB is checked. Computing device 200 also includes a register to hold PK permissions for each protected domain, PKRU 250. PKRU 250, and thus processor 200, in contrast to conventional systems, supports many more additional protection domains that the conventional 16. These "additional" protection domains are shown as PKRU bits 250, with two bits for each domain, being a "write disable" bit wd and a "read disable" bit rd.

Continuing with reference to FIG. 2, as shown for the illustrated embodiments, the core part of PK implementation is performed inside a processor or CPU upon TLB permission checking. Traditionally, whenever there is a memory access in program execution, there are two tasks that must be performed prior to the actual memory access. These include checking TLB permission and obtaining the physical address associated with a virtual, or target linear address. To perform TLB permission checking, the memory controller obtains permission bits in the relevant TLB entry, page table entry 207. These permission bits may include XD, U/S, R/W, P, etc., which stand for "Execute Disable", "User/Supervisor", "Read/Write" and "Child Page Table Present", respectively. When protection domains are enabled, PK bits are added, and the permission checking is performed jointly by TLB permission checking and PK checking. TLB permission checking is performed by the memory controller operating on the standard (non PK) bits, and a permission 210 is output. PK checking is performed by obtaining PK bits 208 and using PK bits 208 as an index to a lookup table, stored in a machine specific register called PKRU. PKRU register 250 contains $2^N$ bits, where N is an integer, and, assuming 2 bits per each protection domain, supports N/2 protection domains. As an example, for 64 protection domains, PKRU 250 would have 128 bits.

In embodiments, extending PK domains has two aspects. First, extending the length of PKRU 250, and second, extending the index into PKRU 250. As noted, in embodiments, a PKRU may be extended to have a size equal to $2^N$ bits, where N is an integer, and $2^N$ is greater than 32. To extend the PK bits index 208 into PKRU 250, M additional bits 203 from a target linear address are used. For example, four PK bits 212+M additional bits 203 are combined to form an index 213 into the extended PKRU. In embodiments, the standard four PK bits may be the LSBs of the index, and the M additional bits the MSBs. Alternatively, other combinations are possible. Using PK bits 212 and additional bits 203 is convenient because prior to a memory access actually occurring the values immediately available to the memory controller are the four PK bits 212 from page table entry 207 and the M additional bits 203 from the target linear address. Since, as described above, extending the number of PK bits in a PTE is difficult, using additional bits from the linear address is an elegant and non-intrusive solution, because, in so doing, more memory domains are supported, but, as long as their permissions allow, there is transparency to any legacy applications.

In embodiments, this transparency may operate as follows. Assuming, for example, that two bits of the linear address are used as additional PK bits, the PK ID is thus constructed by concatenating the two linear address bits with the standard four PK bits from the PTE, yielding a total of six bits. This example thus provides for 64 PKs and 64 corresponding protected memory domains. As noted above, traditionally there are only 16 PKs, where pkey#0 is always the permission "accessible" domain. This allows any legacy memory allocator to work properly, as it will always return an address from pkey#0 (because the PKEY bits in PTE will always be 0). However, the use of extended PK bits, in accordance with various embodiments, imposes constraints on linear addresses when allocating a memory region. In this situation, a memory allocator that is unaware of PK could, for example, return a memory region starting from an arbitrary base address. Because of the constrains put on linear memory when PK domains are activated, the base address could belong to a PK other than 0, such as, for example, PK=16, 32 or 48. In general, the memory region could false into any PK N, where N % 16==0 ("%" is the remainder operation, which returns a remainder after division of the two operands, e.g., 48% 16=0 because 16 evenly divides into 48 with no remainder).

Thus, a software enabling convention is needed. In particular, in order to make sure a legacy memory allocator operates properly, i.e., mmap(NULL, . . . ) would guarantee returning an accessible memory, in embodiments, software (e.g., an operating system) makes sure that a PK N where N % 16==0 (i.e., PK is a multiple of 16) is always "accessible." In this manner transparency may be achieved for PK enabled software when operating with legacy components that are not PK aware.

Thus, in embodiments, a memory access request is received from an instruction being executed by the processor. The request includes a virtual, or linear, target memory address. Using this target linear address (which includes a page address and an offset), target page address 206 is obtained, and input as an index into page table 205, which is stored in TLB 201. If there is an entry in page table 205 for target page address 206, which is the case any time that page has been previously accessed (which is why a TLB is used), a corresponding page table entry 207 is obtained, and, based on the entry, legacy permission 210 generated. Additionally, PKEY bits 212 are also obtained from page table entry 207, and, once combined with M additional bits 203 from the target linear address, are input as an index 213 into PKRU 250 to obtain the permissions entry in PKRU 250 for the indicated protected domain. Using the permission bits for the indicated protection domain, say domain L, wdL and adL, PK permission 230 is generated. In embodiments, PK permission 230 and legacy permission 210 are "ANDed" and an overall permission 250 for that protection domain is output. Thus, even if legacy permission 210 allows the code being executed to access the targeted memory location, if PK permission 230 disallows, then the code faults on the memory access.

In embodiments, in the combination of PK bits 212 and M additional bits 203 to form index 213, the M additional bits may be used as the MSBs of the index. Moreover, canonical bits of the target linear address are used. In this fashion, for every segmentation of the memory space created by the M additional bits, 16 domains may be supported using the conventional 4 PK bits. Thus, for example, if M=4, and 4 additional bits 203 are used, for each of the 16 memory segments created by the 4 additional bits, 16 domains are supported, for a total of 256 protection domains for which permission entries are stored in PKRU 250, and total PKRU bits 250=512 bits.

In embodiments, in order to extend PK domains, and thus the number of bits used to specify an extended PK domain (and thus an index into PKRU 250), a software visible component in hardware may be used to inform a CPU which additional linear address bits 203 are being used, as well as how many of them are being used. For example, in a 48 bit linear address space (4-level paging), bits 47:[47−(M+1)], or 47:44 for M=4, may be used. Or, for example, for 57 bit paging (5-level paging), bits 56:[56−(M+1)], or 56:52 for M=5, of the linear address may be used. In either case, however, there is no constraint on which bit is the starting bit, and other fields of bits may be used for additional bits 203, in alternate embodiments. In embodiments, both the starting bit and the number of additional linear address bits to be used for the PK extension may be represented in dedicated control registers used to toggle CPU features, such as, for example, model specific registers (MSRs), which are programmable by software, e.g., an operating system.

In addition, in embodiments, to enable a PK extension, CR4 bits may be added. In embodiments, the enabling may be consistent with existing PK enabling, and thus if extended PK domains are used, they may be enabled per-logical processor.

Figure 3:
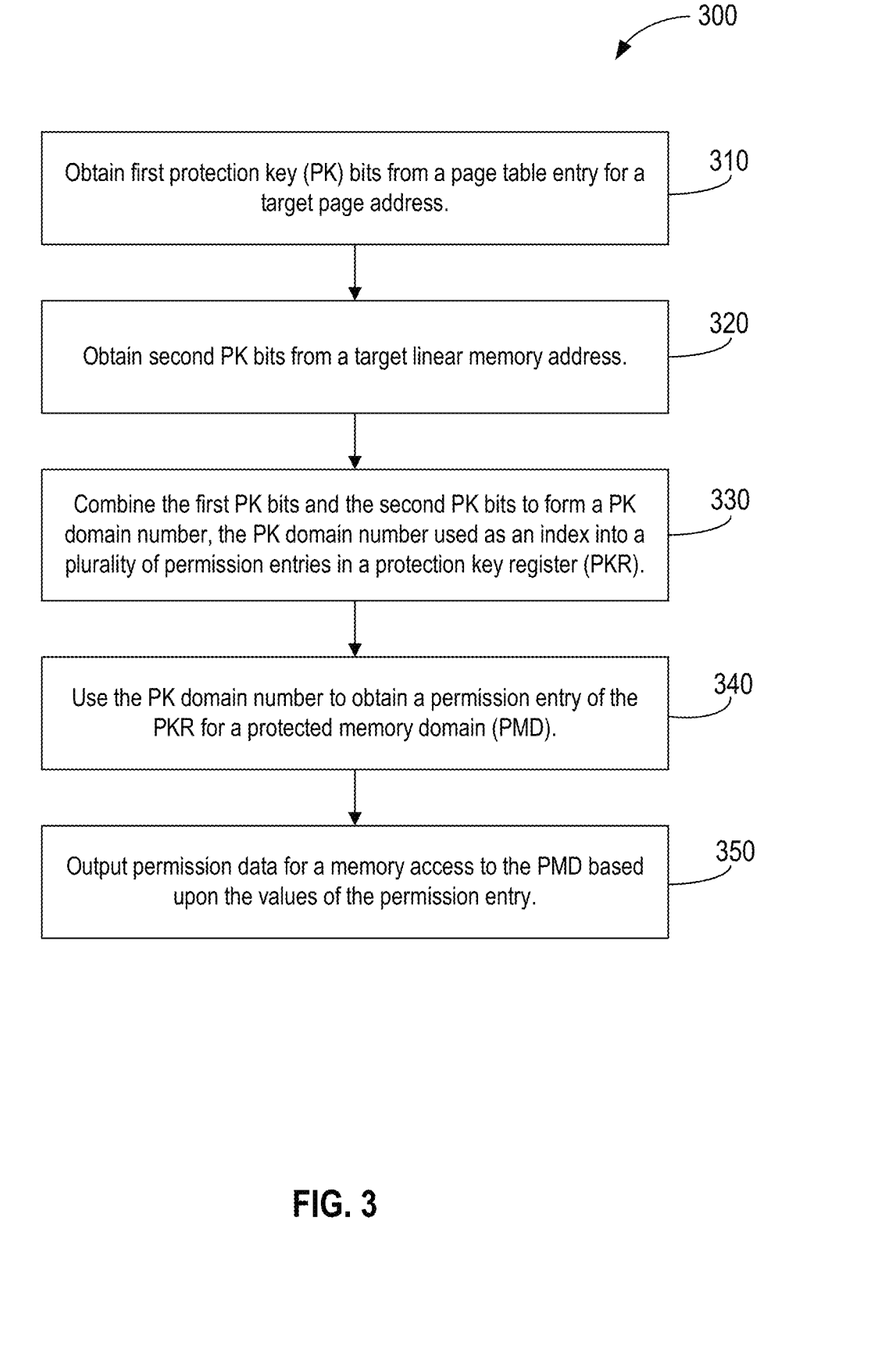
FIG. 3 illustrates an example process for obtaining protected memory domain permissions from an entry in a protection key register (PKR), in accordance with various embodiments.

Referring now to FIG. 3, an overview of the operational flow of a process 300 for obtaining protected memory domain permissions from an entry in a protection key register (PKR), in accordance with various embodiments, is presented. Process 300 may be performed by a CPU or processor, such as processor 502 of FIG. 5, or a memory controller or memory execution unit (MEU) within or outside a CPU, such as, for example, memory controller 201 of FIG. 2, in accordance with various embodiments. Process 300 may include blocks 310 through 350. In alternate embodiments, process 300 may have more or less operations, and some of the operations may be performed in different order.

As noted above, methods according to various embodiments combine bits from different sources to form a protection key (PK) domain number. The PK domain number is then used to index into a register that stores a plurality of permission entries corresponding to the protected memory domains maintained by an operating system running on the CPU or processor. Two example methods are next described.

With reference to FIG. 3, process 300 begins at block 310, where the CPU or memory controller obtains first protection key bits from a page table entry for a target page address.

From block 310, process 300 proceeds to block 320, where the CPU or memory controller obtains first protection key bits from a page table entry for a target page address. The page table may be, for example, page table 205, stored in TLB 201, as shown in FIG. 2.

From block 320, process 300 moves to block 330, where the first PK bits (obtained from the page table entry), and the second PK bits (obtained from the target linear memory address), are combined to form a PK domain number, which is used as an index to a plurality of permission entries in a protection key register (PKR). The PKR may be, for example, PKRU 250, as shown in FIG. 2, or, for example, protection key register 525 shown in FIG. 5.

From block 330, process 300 proceeds to block 340, where the PK domain number is used to obtain a permission entry of the PKR for a protected memory domain (PMD) associated with the PK domain number. For example, the PMD may be, for example, domain K or domain L, both shown in FIG. 1B.

Finally, from block 340, process 300 proceeds to block 350, where the CPU or memory controller outputs permission data for a memory access to the PMD based upon the values of the permission entry.

It is noted that, in general, a PKR is specific to a logical processor, so each thread being executed in a computing device has its own PKR, different from other threads. Thus, a multi-threading application or process may have several PKR register values.

Figure 4:
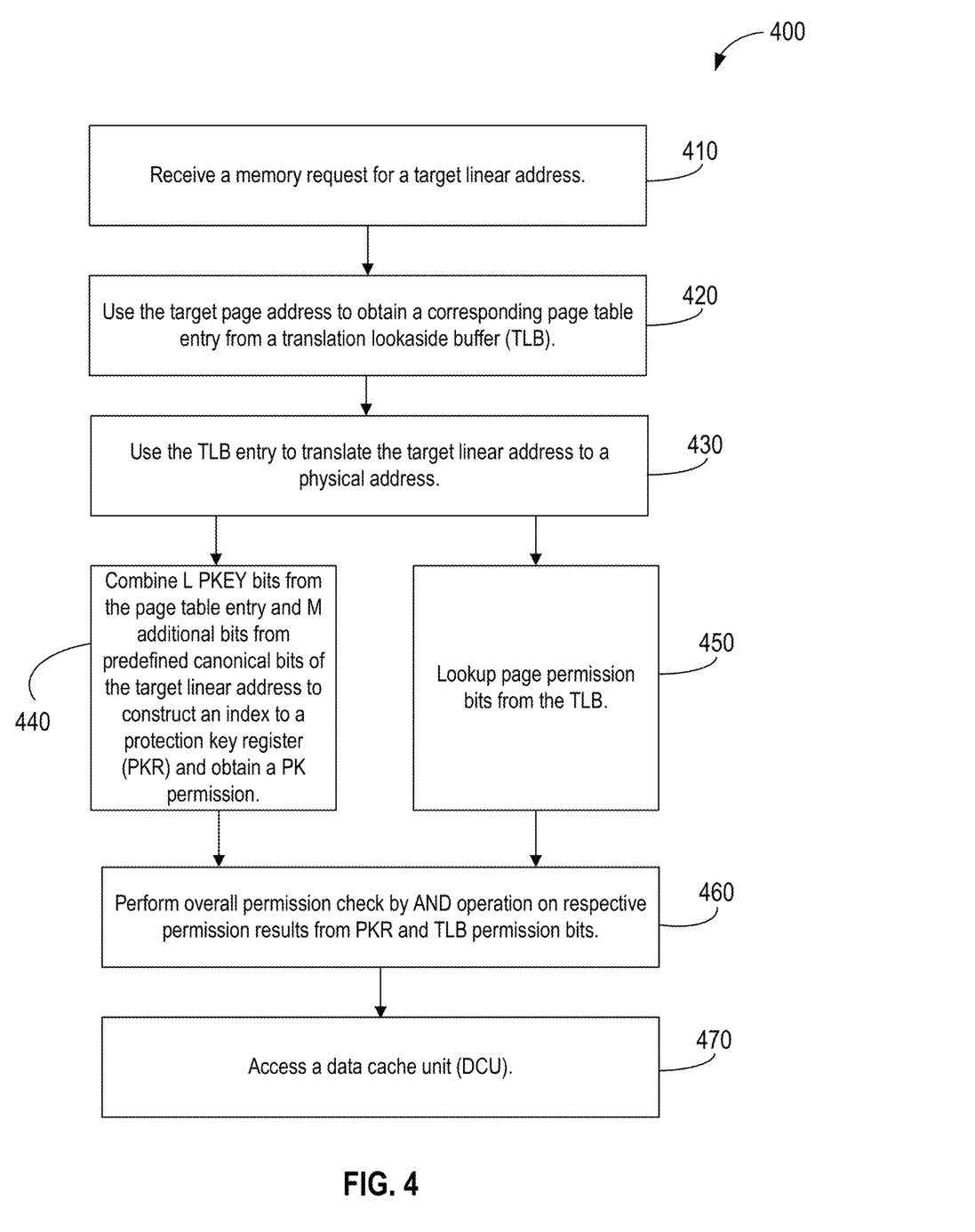
FIG. 4 illustrates an example process for receiving a memory access request, and, using a supplied targeted linear address from the request, obtaining legacy and protected memory domain permissions, and generating an overall permission, in accordance with various embodiments.

FIG. 4 illustrates a related, but more detailed process, process 400, to that shown in FIG. 3, described above. Referring now to FIG. 4, an overview of the operational flow of a process 400 for receiving a memory access request during program execution, and, using a supplied targeted linear address from the request, obtaining legacy and protected memory domain permissions and generating an overall permission, in accordance with various embodiments, is presented. Process 400 may be performed by a CPU or processor, such as processor 502 of FIG. 5, a memory controller, such as, for example, memory controller 201 of FIG. 2, or a memory execution unit (MEU) of a CPU, such as memory execution unit 503, in accordance with various embodiments, such as, for example, in a CPU component call MEU. Process 400 may include blocks 410 through 470. In alternate embodiments, process 400 may have more or less operations, and some of the operations may be performed in different order.

With reference to FIG. 4, process 400 begins at block 410, where a memory request for a target linear address is received. This may occur, for example, during execution of a program by the CPU. The target linear address, which is a virtual address, includes a target page address. From block 410, process 400 proceeds to block 420, where the CPU or memory controller uses the target page address to obtain a corresponding TLB entry from a page table stored in a TLB, also provided in the CPU. The page table may be, for example, page table 205, stored in TLB 201, as shown in FIG. 2, or stored in TLB 521 of processor 502, of FIG. 5.

From block 420, process 400 moves to block 430, where, using the TLB entry, the target linear address is translated to a physical address.

From block 430, process 400 moves in parallel to blocks 440 and 450. In block 440, L PKEY bits from the page table entry (obtained at block 420) are combined with additional M bits from predefined canonical bits of the target linear address to construct an index to a PKR and obtain a PK permission. For example, FIG. 2 shows 4 PKEY bits 212 in the second field (following the XD bit) of page table entry 207, and also shows 4 additional bits 203 from the target linear address, combined and input as an index 213 to extended PKRU 250. Using the index to the PKRU 250, a PK permission entry for the PK domain indicated by the index are read. As noted above, a PK permission entry may include two bits per domain, such as, for example, a "wd" or "write denied" bit, as well as a "rd" or "read denied" bit, as shown in extended PKRU 250 of FIG. 2.

At the same time that process 400 is at block 440, it operates in parallel at block 450, where page permission bits from the TLB are looked up. These bits indicate "page permission" and may include XD, U/S, R/W and P, as described above in connection with FIG. 2, which collectively determine legacy memory permission 210, as shown in FIG. 2.

From blocks 440 and 450, process 400 again converges, proceeds to block 460, where an overall permission check is done by performing an AND operation on the permission results respectively obtained from the PKR and the TLB permission bits. For example, the overall permission may be that obtained at 250, in FIG. 2, which is the result of an AND operation performed on legacy memory permission 210 and PK permission 230.

Finally, from block 460, process 400 proceeds to block 470, where, given an overall permission to do so obtained at block 460, a data cache unit is accessed.

Figure 5:
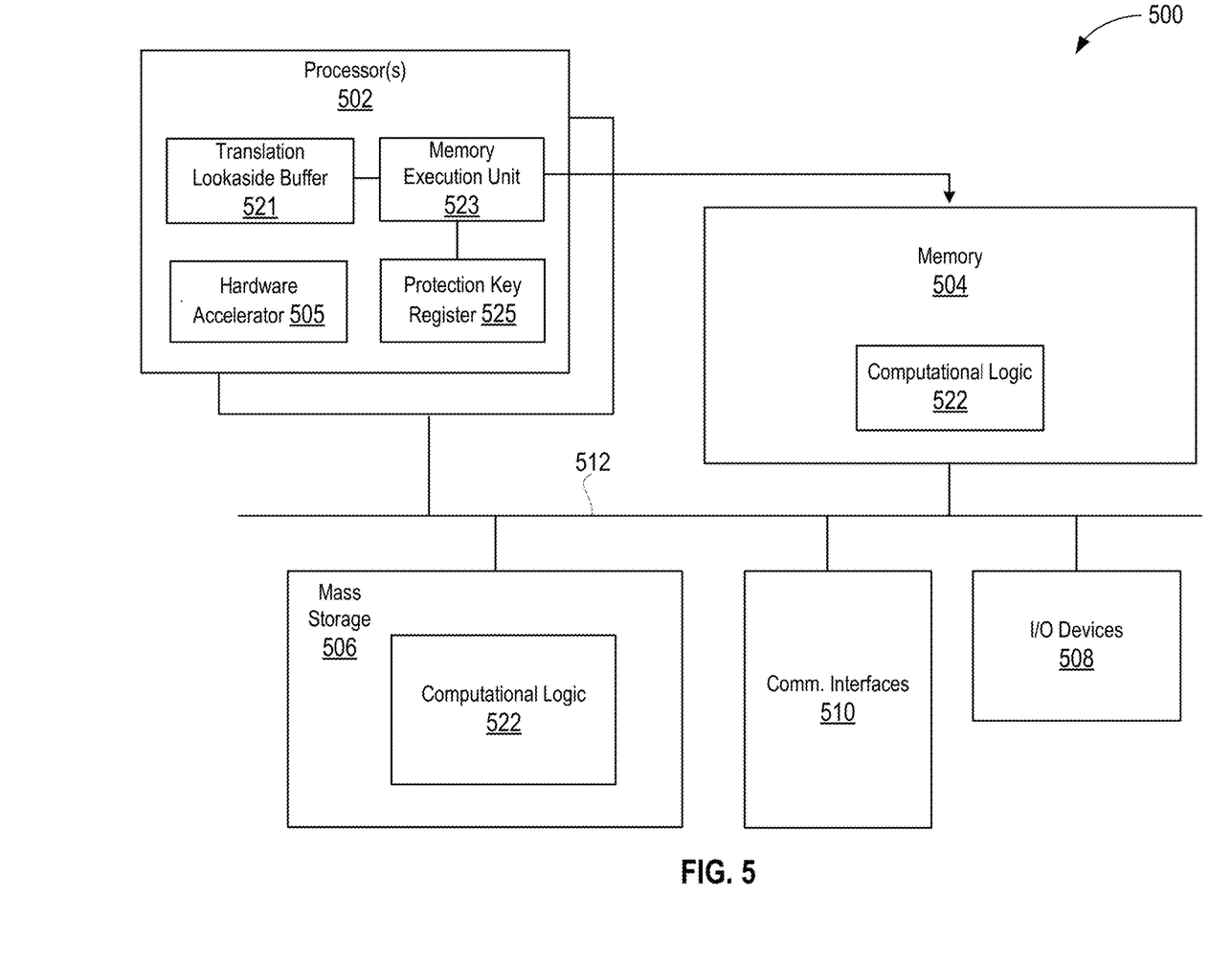
FIG. 5 illustrates a block diagram of a computer device suitable for practicing the present disclosure, in accordance with various embodiments.

Referring now to FIG. 5 wherein a block diagram of a computer device suitable for practicing the present disclosure, in accordance with various embodiments, is illustrated. As shown, computer device 500 may include one or more processors 502, and system memory 504. Each processor 502 may include one or more processor cores, and hardware accelerator 505. An example of hardware accelerator 507 may include, but is not limited to, programmed field programmable gate arrays (FPGA). Each processor 502 may also include memory execution unit (MEU) 523, which may be connected to each of translation lookaside buffer 521 and protection key permissions register 525. MEU may obtain bits from each of a page table entry of TLB 521 and a target linear address (not shown), combine them to form a PK domain number, and use the PK domain number to index into a plurality of permission entries stored in protection key register 525 to obtain a permission entry for a protected memory domain, as described in detail above. MEU 523 may also be coupled to memory 504, as shown.

Computer device 500 may also include system memory 504. In embodiments, system memory 504 may include any known volatile or non-volatile memory. Additionally, computer device 500 may include mass storage device(s) 506 (such as SSDs 509), input/output device interfaces 508 (to interface with various input/output devices, such as, mouse, cursor control, display device (including touch sensitive screen), and so forth) and communication interfaces 510 (such as network interface cards, modems and so forth). In embodiments, communication interfaces 510 may support wired or wireless communication, including near field communication. The elements may be coupled to each other via system bus 512, which may represent one or more buses. In the case of multiple buses, they may be bridged by one or more bus bridges (not shown).

In embodiments, system memory 504 and mass storage device(s) 517 may be employed to store a working copy and a permanent copy of the executable code of the programming instructions of an operating system, one or more applications, and/or various software implemented components of sandbox 106, of FIG. 1A, TLB 201, page table 205 and memory controller 201, all of FIG. 2, or MEU 523 and TLB 521 of FIG. 5, collectively referred to as computational logic 522. The programming instructions implementing computational logic 522 may comprise assembler instructions supported by processor(s) 502 or high-level languages, such as, for example, C, that can be compiled into such instructions. In embodiments, some of computing logic may be implemented in hardware accelerator 505. In embodiments, part of computational logic 522, e.g., a portion of the computational logic 522 associated with the runtime environment of the compiler may be implemented in hardware accelerator 505.

The permanent copy of the executable code of the programming instructions or the bit streams for configuring hardware accelerator 505 may be placed into permanent mass storage device(s) 506 and/or hardware accelerator 505 in the factory, or in the field, through, for example, a distribution medium (not shown), such as a compact disc (CD), or through communication interfaces 510 (from a distribution server (not shown)).

The number, capability and/or capacity of these elements 502-525 may vary, depending on the intended use of example computer device 500, e.g., whether example computer device 500 is a smartphone, tablet, ultrabook, a laptop, a server, a set-top box, a game console, a camera, and so forth. The constitutions of these elements 510-525 are otherwise known, and accordingly will not be further described.

Figure 6:
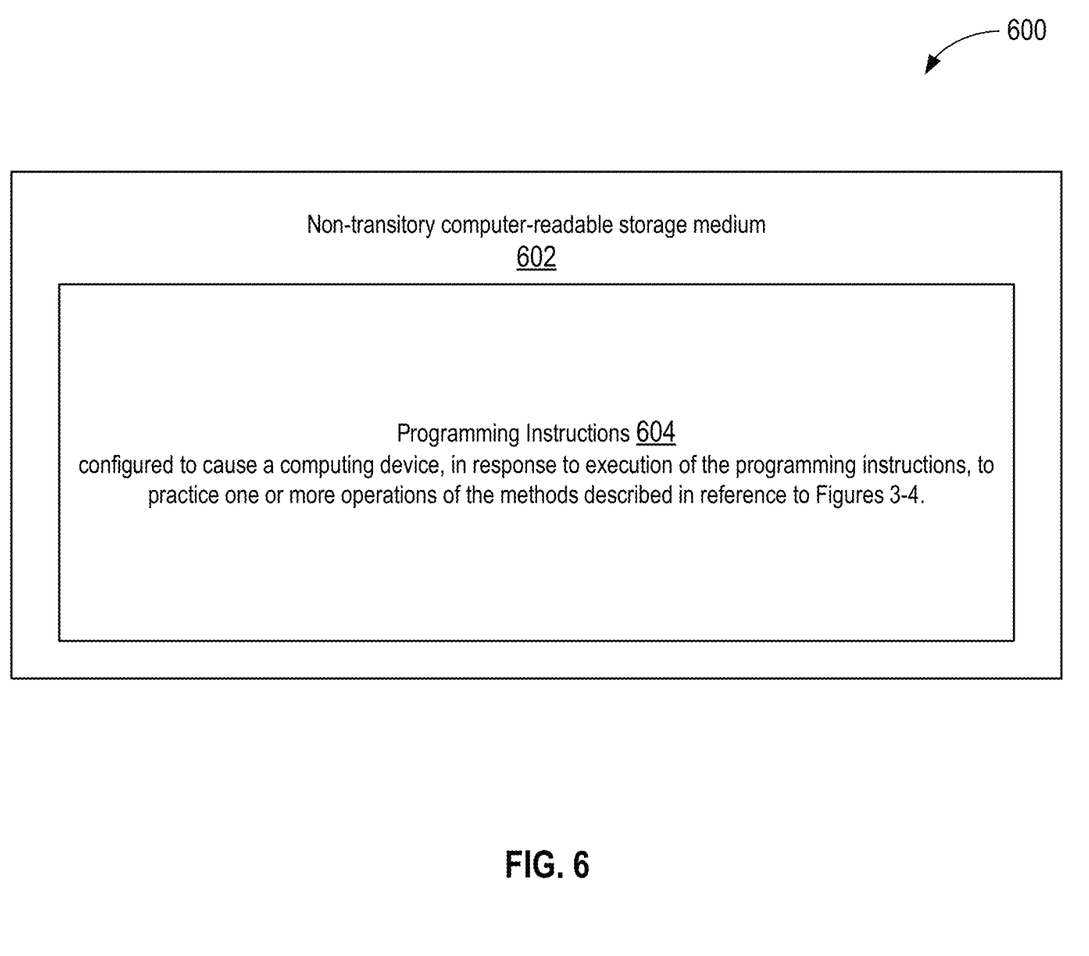
FIG. 6 illustrates an example computer-readable storage medium having instructions configured to practice aspects of the processes of FIGS. 3 and 4, in accordance with various embodiments.

FIG. 6 illustrates an example computer-readable storage medium 600 having instructions configured to implement all (or portion of) software implementations of sandbox 106, of FIG. 1A, TLB 201, page table 205 and memory controller 201, all of FIG. 2, MEU 523 and TLB 521 of FIG. 5, and/or practice (aspects of) processes 300 of FIG. 3, and 400 of FIG. 4, earlier described, in accordance with various embodiments. As illustrated, computer-readable storage medium 602 may include the executable code of a number of programming instructions or bit streams 604. Executable code of programming instructions (or bit streams) 604 may be configured to enable a device, e.g., computer device 500, in response to execution of the executable code/programming instructions (or operation of an encoded hardware accelerator 505), to perform (aspects of) processes performed by sandbox 106, of FIG. 1A, memory controller 201 of FIG. 2, or MEU 523 of FIG. 5, and/or practice (aspects of) processes 300 of FIG. 3 and 400 of FIG. 4. In alternate embodiments, executable code/programming instructions/bit streams 604 may be disposed on multiple non-transitory computer-readable storage medium 602 instead. In embodiments, computer-readable storage medium 602 may be non-transitory. In still other embodiments, executable code/programming instructions 604 may be encoded in transitory computer readable medium, such as signals.

Referring back to FIG. 5, for one embodiment, at least one of processors 502 may be packaged together with a computer-readable storage medium having some or all of computing logic 522 (in lieu of storing in system memory 504 and/or mass storage device 506) configured to practice all or selected ones of the operations earlier described with reference to FIGS. 3-4. For one embodiment, at least one of processors 502 may be packaged together with a computer-readable storage medium having some or all of computing logic 522 to form a System in Package (SiP). For one embodiment, at least one of processors 502 may be integrated on the same die with a computer-readable storage medium having some or all of computing logic 522. For one embodiment, at least one of processors 502 may be packaged together with a computer-readable storage medium having some or all of computing logic 522 to form a System on Chip (SoC). For at least one embodiment, the SoC may be utilized in, e.g., but not limited to, a hybrid computing tablet/laptop.

Illustrative examples of the technologies disclosed herein are provided below. An embodiment of the technologies may include any one or more, and any combination of, the examples described below.

Examples

Example 1 is an apparatus for computing, comprising: a protection key register (PKR) having $2^N$ bits, where N is an integer, to store a plurality of permission entries corresponding to protected memory domains; and a protected memory domain controller, coupled to the PKR, to: obtain protection key (PK) bits from a page table entry for a target page address; obtain one or more additional PK bits from a target linear memory address; and combine the PK bits and the additional PK bits to form a PK domain number to index into the plurality of permission entries in the PKR to obtain a permission entry for a protected memory domain.

Example 2 is the apparatus of example 1, and/or any other example herein, wherein each permission entry in the PKR has M bits, M being a multiple of 2, and wherein the PKR includes permission entries for $2^N/M$ protected memory domains.

Example 3 is the apparatus of example 2, and/or any other example herein, wherein $2^N/M=64$.

Example 4 is the apparatus of example 1, and/or any other example herein, wherein the PKR has 128 bits, each permission entry in the PKR has 2 bits, and wherein the PK domain number includes four PK bits from the page table entry, and two additional PK bits.

Example 5 is the apparatus of example 1, and/or any other example herein, wherein the PK bits are the least significant bits (LSBs) of the PK domain number.

Example 6 is the apparatus of example 1, and/or any other example herein, wherein each PKR entry has two bits, a first bit indicating whether the protected memory domain may be accessed, and a second bit indicating whether the protected memory domain may be written into.

Example 7 is the apparatus of example 1, and/or any other example herein, wherein the protected memory domain controller is further arranged to read the permission entry of the PKR at the location indexed by the PK domain number.

Example 8 is the apparatus of example 7, and/or any other example herein, wherein the protected memory domain controller is further arranged to output permission data for a memory access to the protected memory domain, based on reading the permission entry at the indexed PKR location.

Example 9 is the apparatus of example 1, and/or any other example herein, further comprising a translation lookaside buffer (TLB) to store the page table.

Example 10 is the apparatus of example 1, and/or any other example herein, wherein the one or more additional PK bits are bits of the target linear address not otherwise needed for memory addressing.

Example 11 is the apparatus of example 10, and/or any other example herein, wherein the number of additional PK bits is from 1-16.

Example 12 is the apparatus of example 1, and/or any other example herein, wherein the apparatus is a central processing unit (CPU) having the PKR and the protected memory domain controller.

Example 13 is one or more non-transitory computer-readable storage media comprising a set of instructions, which, when executed on memory control logic (MCL) coupled to a protection domain permission register (PDPR) that stores a plurality of permission entries corresponding to protected memory domains, cause the MCL to: read PK bits from a page table entry for a target page address; read one or more additional PK bits from a target linear memory address; and combine the PK bits and the additional PK bits to form a protected memory domain number (PMDN) to index into the plurality of entries in the PDPR, to obtain a permission entry relating to a protected memory domain (PMD).

Example 14 is the one or more non-transitory computer-readable storage media of example 13, and/or any other example herein, wherein the PDPR has $2^N$ total bits, where N is an integer.

Example 15 is the one or more non-transitory computer-readable storage media of example 14, and/or any other example herein, wherein each PDPR entry has M bits, M a multiple of 2, and wherein the PDPR includes permission entries for $2^N/M$ PMDs.

Example 16 is the one or more non-transitory computer-readable storage media of example 13, and/or any other example herein, wherein each PDPR entry has 2 bits, a first bit indicating whether the PMD may be accessed, a second bit indicating whether the PMD may be written into.

Example 17 is the one or more non-transitory computer-readable storage media of example 13, and/or any other example herein, further comprising instructions that, when executed, further cause the MCL to read the entry of the PDPR at the location indexed by the PMDN.

Example 18 is the one or more non-transitory computer-readable storage media of example 17, and/or any other example herein, further comprising instructions that, when executed, further cause the MCL to output permission data for a memory access to the PMD, based on reading the permission entry at the indexed PDPR location.

Example 19 is the one or more non-transitory computer-readable storage media of example 18, and/or any other example herein, wherein if the permission data denies access to the PMD, that access denial overrides any memory access permission otherwise determined for the target page address based on the page table entry.

Example 20 is a method of obtaining memory domain permissions by a memory controller (MC) of a CPU, the MC coupled to a protection key register (PKR) that stores a plurality of permission entries corresponding to protected memory domains, comprising: obtaining first protection key (PK) bits from a page table entry for a target page address; obtaining second PK bits from a target linear memory address; combining the first PK bits and the second PK bits to form a PK domain number, the PK domain number an index into the plurality of permission entries in the PKR; and using the PK domain number, obtaining a permission entry for a protected memory domain (PMD).

Example 21 is the method of example 20, and/or any other example herein, further comprising using the first PK bits as the LSBs of the PK domain number, and the second PK bits as the most significant bits (MSBs) of the PK domain number.

Example 22 is the method of example 21, and/or any other example herein, wherein the PKR holds $2^N$ bits total, where N is an integer, wherein each PKR entry has M bits, M a multiple of 2, and wherein the PKR includes entries for $2^N/M$ PMDs.

Example 23 is the method of example 22, and/or any other example herein, wherein the number of first PK bits and the number of second PK bits sum to $\log_2 \{2^N/M\}$.

Example 24 is the method of example 21, and/or any other example herein, wherein each PKR entry has 2 bits, a first bit indicating whether the PMD may be accessed, a second bit indicating whether the PMD may be written into, and further comprising reading the entry of the PKR at the location indexed by the PK domain number.

Example 25 is the method of example 24, and/or any other example herein, further comprising outputting to the CPU permission data for a memory access to the PMD, based the contents of the entry at the indexed PKR location.

Example 26 is an apparatus for computing, coupled to a protection key register (PKR) that stores a plurality of permission entries corresponding to protected memory domains, comprising: means for obtaining first protection key (PK) bits from a page table entry for a target page address; means for obtaining second PK bits from a target linear memory address; means for combining the first PK bits and the second PK bits to form a PK domain number, the PK domain number an index into the plurality of permission entries in the PKR; and means for obtaining a permission entry for a protected memory domain (PMD) using the PK domain number.

Example 27 is the apparatus for computing of example 26, and/or any other example herein, wherein the means for combining uses the first PK bits as the LSBs of the PK domain number, and the second PK bits as the MSBs of the PK domain number.

Example 28 is the apparatus for computing of example 27, and/or any other example herein, wherein the PKR holds $2^N$ bits total, where N is an integer, wherein each PKR entry has M bits, M a multiple of 2, and wherein the PKR includes entries for $2^N/M$ PMDs.

Example 29 is the apparatus for computing of example 28, and/or any other example herein, wherein the number of first PK bits and the number of second PK bits sum to $\log_2 \{2^N/M\}$.

Example 30 is the apparatus for computing of example 27, and/or any other example herein, wherein each PKR entry has 2 bits, a first bit indicating whether the PMD may be accessed, a second bit indicating whether the PMD may be written into, and further comprising reading the entry of the PKR at the location indexed by the PK domain number.

Example 31 is the apparatus for computing of example 30, and/or any other example herein, further comprising means for outputting to a CPU permission data for a memory access to the PMD, based the contents of the entry at the indexed PKR location.

Example 32 is an apparatus for computing, coupled to a protection domain permission register (PDPR) that stores a plurality of permission entries corresponding to protected memory domains, comprising: means for reading PK bits from a page table entry for a target page address; means for reading one or more additional PK bits from a target linear memory address; and means for combining the PK bits and the additional PK bits to form a protected memory domain number (PMDN) to index into the plurality of entries in the PDPR, to obtain a permission entry relating to a protected memory domain (PMD).

Example 33 is the apparatus for computing of example 32, and/or any other example herein, wherein the PDPR has $2^N$ total bits, where N is an integer.

Example 34 is the apparatus for computing of example 32, and/or any other example herein, further comprising means for reading the entry of the PDPR at the location indexed by the PMDN.

Example 35 is the apparatus for computing of example 34, and/or any other example herein, further comprising means for outputting permission data for a memory access to the PMD, based on results of reading the permission entry at the indexed PDPR location.

Example 36 is the apparatus for computing of example 35, and/or any other example herein, wherein if the permission data denies access to the PMD, that access denial overrides any memory access permission otherwise determined for the target page address based on the page table entry.

What is claimed is:

1. An apparatus for computing, comprising:
a protection key register (PKR) to store a plurality of permission entries corresponding to a plurality of protected memory domains; and
a protected memory domain controller, coupled to the PKR, to:
obtain protection key (PK) bits from a page table entry of a page table for a target page address in a target linear memory address having the target page address and an offset;
obtain one or more additional bits directly from the target linear memory address; and
combine the PK bits and the additional bits to form a PK domain number to index into the plurality of permission entries in the PKR to obtain one of the plurality of permission entries for a corresponding one of the protected memory domains.

2. The apparatus of claim 1, wherein each permission entry in the PKR has M bits, M being a multiple of 2, and wherein the PKR includes permission entries for $2^N/M$ protected memory domains, where N is an integer.

3. The apparatus of claim 2, wherein $2^N/M=64$.

4. The apparatus of claim 1, wherein the PKR has 128 bits, each permission entry in the PKR has 2 bits, and wherein the PK domain number includes four PK bits from the page table entry, and two additional PK bits.

5. The apparatus of claim 1, wherein the PK bits are least significant bits (LSBs) of the PK domain number.

6. The apparatus of claim 1, wherein each PKR entry has two bits, a first bit indicating whether the protected memory domain may be accessed, and a second bit indicating whether the protected memory domain may be written into.

7. The apparatus of claim 1, wherein the protected memory domain controller is further arranged to read the permission entry of the PKR at a location indexed by the PK domain number.

8. The apparatus of claim 7, wherein the protected memory domain controller is further arranged to output permission data for a memory access to the protected memory domain, based on reading the permission entry at the indexed PKR location.

9. The apparatus of claim 1, further comprising a translation lookaside buffer (TLB) to store the page table.

10. The apparatus of claim 1, wherein the one or more additional bits are bits of the target linear memory address not otherwise needed for memory addressing.

11. The apparatus of claim 10, wherein a number of the one or more additional bits is from 1 to 16.

12. The apparatus of claim 1, wherein the apparatus is a central processing unit (CPU) having the PKR and the protected memory domain controller.

13. One or more non-transitory computer-readable storage media comprising a set of instructions, which, when executed on memory control logic (MCL) coupled to a protection domain permission register (PDPR) that stores a plurality of permission entries corresponding to a plurality of protected memory domains, cause the MCL to:
read PK bits from a page table entry of a page table for a target page address in a target linear memory address having the target page address and an offset;
read one or more additional bits directly from the target linear memory address; and
combine the PK bits and the additional bits to form a protected memory domain number (PMDN) to index into the plurality of entries in the PDPR, to obtain one of the plurality of permission entries corresponding to one of the plurality of protected memory domains (PMD).

14. The one or more non-transitory computer-readable storage media of claim 13, wherein the PDPR has $2^N$ total bits, where N is an integer.

15. The one or more non-transitory computer-readable storage media of claim 14, wherein each PDPR entry has M bits, M being a multiple of 2, and wherein the PDPR includes permission entries for $2^N/M$ PMDs.

16. The one or more non-transitory computer-readable storage media of claim 13, wherein each PDPR entry has 2 bits, a first bit indicating whether the PMD may be accessed, and a second bit indicating whether the PMD may be written into.

17. The one or more non-transitory computer-readable storage media of claim 13, further comprising instructions that, when executed, further cause the MCL to read the entry of the PDPR at a location indexed by the PMDN.

18. The one or more non-transitory computer-readable storage media of claim 17, further comprising instructions that, when executed, further cause the MCL to output permission data for a memory access to the PMD, based on reading the permission entry at the indexed PDPR location.

19. The one or more non-transitory computer-readable storage media of claim 18, wherein if the permission data denies access to the PMD, that access denial overrides any memory access permission otherwise determined for the target page address based on the page table entry.

20. A method of obtaining memory domain permissions by a memory controller (MC) of a CPU, the MC coupled to a protection key register (PKR) that stores a plurality of permission entries corresponding to a plurality of protected memory domains, comprising:
obtaining protection key (PK) bits from a page table entry of a page table for a target page address in a target linear memory address having the target page address and an offset;
obtaining additional bits directly from the target linear memory address;
combining the PK bits and the additional bits to form a PK domain number, the PK domain number an index into the plurality of permission entries in the PKR; and
using the PK domain number, obtaining one of the plurality of permission entries corresponding to one of the protected memory domains (PMD).

21. The method of claim 20, further comprising using the PK bits as LSBs of the PK domain number, and the additional bits as most significant bits (MSBs) of the PK domain number.

22. The method of claim 21, wherein the PKR holds $2^N$ bits total, where N is an integer, wherein each PKR entry has M bits, M being a multiple of 2, and wherein the PKR includes entries for $2^N/M$ PMDs.

23. The method of claim 22, wherein the number of PK bits and the number of additional bits sum to $\log_2 \{2^N/M\}$.

24. The method of claim 21, wherein each PKR entry has 2 bits, a first bit indicating whether the PMD may be accessed, a second bit indicating whether the PMD may be written into, and further comprising reading the entry of the PKR at a location indexed by the PK domain number.

25. The method of claim 24, further comprising outputting to the CPU permission data for a memory access to the PMD, based the contents of the entry at the indexed PKR location.

\* \* \* \* \*